(12) United States Patent
Betz et al.

(10) Patent No.: US 12,353,245 B2
(45) Date of Patent: Jul. 8, 2025

(54) ARRANGEMENT WITH A TABLET COMPUTER UNIT AND A HOUSING PART OF A MEDICAL IMAGING APPARATUS

(71) Applicant: Siemens Healthcare GmbH, Erlangen (DE)

(72) Inventors: Tobias Betz, Thalmaessing (DE); Marquart Ciolek, Nuremberg (DE); Kay Uwe Seemann, Emskirchen (DE); Roman Achleitner, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 459 days.

(21) Appl. No.: 17/356,786

(22) Filed: Jun. 24, 2021

(65) Prior Publication Data

US 2021/0405700 A1 Dec. 30, 2021

(30) Foreign Application Priority Data

Jun. 30, 2020 (DE) .................... 10 2020 208 173.5

(51) Int. Cl.
*G06F 1/16* (2006.01)
(52) U.S. Cl.
CPC .......... *G06F 1/1632* (2013.01); *G06F 1/1677* (2013.01)
(58) Field of Classification Search
CPC .... G06F 1/1632; G06F 1/1683; G06F 1/1677; H02J 50/10; H02J 50/80; H02J 50/005
See application file for complete search history.

(56) References Cited

U.S. PATENT DOCUMENTS

| 5,544,010 | A | 8/1996 | Schultz et al. |
| 5,596,762 | A | 1/1997 | Rudi |
| 8,553,408 | B2 * | 10/2013 | Supran .................. G06F 1/1632 361/679.02 |

(Continued)

FOREIGN PATENT DOCUMENTS

| DE | 102016218138 A1 | 3/2018 |
| DE | 102019209166 A1 | 10/2020 |

OTHER PUBLICATIONS

Kabellose-Ladegeraete.DE:; "IPad bzw. Tablet kabellos laden: Alle Qi Tablets im Überlick"; URL: https://www.kabellose-ladegeraete.de/blog/tablet-kabellos-laden-qi-tablet-ueberblick/.

*Primary Examiner* — Nidhi Thaker
(74) *Attorney, Agent, or Firm* — Harness, Dickey & Pierce, P.L.C.

(57) ABSTRACT

An arrangement includes a tablet computer unit with a tablet computer and a first connecting unit, the second connecting unit having a set of ferromagnetic regions. The arrangement further includes a housing part of a medical imaging apparatus, wherein the housing part of the medical imaging apparatus has a covering and a second connecting unit. The covering has a depression in which the tablet computer unit can be accommodated in a form-fit manner and the second connecting unit is arranged in a region of the depression such that via the first connecting unit and the second connecting unit, a magnetic connection is formable which counteracts a removal of the tablet computer unit from the depression. The tablet computer unit includes a first contact-based energy transfer element for receiving electrical energy for the tablet computer, the energy transfer element being arranged in a region of the first connecting unit.

23 Claims, 11 Drawing Sheets

(56) References Cited

U.S. PATENT DOCUMENTS

| | | | |
|---|---|---|---|
| 8,688,037 B2* | 4/2014 | Chatterjee | G06F 1/1632 |
| | | | 359/214.1 |
| 9,778,691 B2* | 10/2017 | Sedlmair | G06F 3/0231 |
| 9,886,060 B2 | 2/2018 | Goy et al. | |
| 9,887,030 B2* | 2/2018 | Lee | H01F 7/0252 |
| 10,191,514 B2 | 1/2019 | Bidwell et al. | |
| 10,485,312 B2 | 11/2019 | Rodriguez | |
| 10,969,825 B2* | 4/2021 | Lo | G06F 1/1632 |
| 11,809,230 B2* | 11/2023 | Ciolek | G06F 1/1632 |
| 11,822,387 B2* | 11/2023 | Pelissier | F16M 13/00 |
| 11,977,412 B2* | 5/2024 | Miles | F16M 11/22 |
| 2006/0002070 A1 | 1/2006 | Jenkins et al. | |
| 2006/0119569 A1 | 6/2006 | Tsai | |
| 2007/0097617 A1 | 5/2007 | Searby et al. | |
| 2007/0097618 A1 | 5/2007 | Searby et al. | |
| 2008/0059681 A1 | 3/2008 | Lodolo et al. | |
| 2010/0081377 A1 | 4/2010 | Chatterjee et al. | |
| 2010/0131691 A1* | 5/2010 | Chatterjee | G06F 1/26 |
| | | | 710/303 |
| 2013/0068915 A1 | 3/2013 | Yang | |
| 2014/0183065 A1 | 7/2014 | Toulotte | |
| 2015/0083615 A1 | 3/2015 | Lay et al. | |
| 2016/0241289 A1 | 8/2016 | Wieth | |
| 2016/0261133 A1 | 9/2016 | Wang | |
| 2017/0063102 A1* | 3/2017 | Sultenfuss | H02J 50/80 |
| 2017/0110911 A1* | 4/2017 | Bossetti | H02J 7/0042 |
| 2017/0237460 A1 | 8/2017 | Rayner | |
| 2017/0279478 A1 | 9/2017 | Fathollahi | |
| 2018/0055166 A1 | 3/2018 | Rodriguez | |
| 2018/0078222 A1 | 3/2018 | Boettger et al. | |
| 2018/0279979 A1* | 10/2018 | Mueller | A61B 6/032 |
| 2021/0405700 A1 | 12/2021 | Betz et al. | |

\* cited by examiner

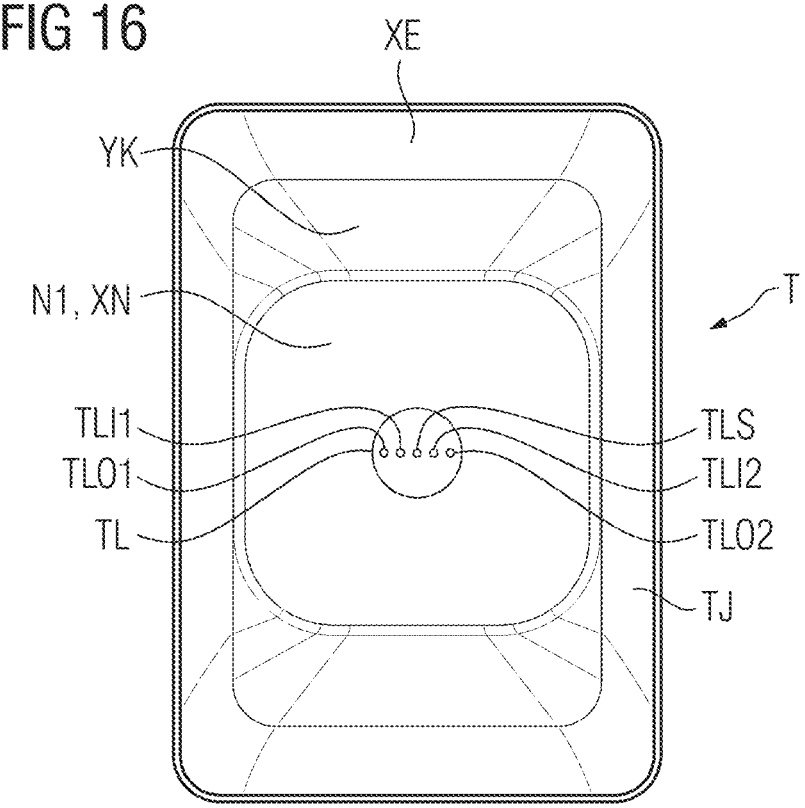

ARRANGEMENT WITH A TABLET COMPUTER UNIT AND A HOUSING PART OF A MEDICAL IMAGING APPARATUS

PRIORITY STATEMENT

The present application hereby claims priority under 35 U.S.C. § 119 to German patent application number DE 102020208173.5 filed Jun. 30, 2020, the entire contents of which are hereby incorporated herein by reference.

FIELD

Example embodiments of the invention generally relate to an arrangement having a tablet computer unit with a tablet computer and a housing part of a medical imaging apparatus.

BACKGROUND

A medical imaging apparatus can be operated, in particular, via a tablet computer. During a medical examination that is carried out with the medical imaging apparatus, it can be advantageous if, for particular examination steps, the tablet computer can be attached to a housing part of the medical imaging apparatus and, for other examination steps, can be used detached from the housing part. Furthermore, it is advantageous if the tablet computer can be charged with electrical energy while it is attached to the housing part. The housing part of the medical imaging apparatus can be, for example, a housing part of a gantry of the medical imaging apparatus or a housing part of a docking station of the medical imaging apparatus, wherein the docking station of the medical imaging apparatus can be arranged separately from, and independently of, the gantry of the medical imaging apparatus.

SUMMARY

At least one embodiment of the invention enables an improved arrangement of a tablet computer unit on a housing part of a medical imaging apparatus.

Further advantageous embodiments of the invention are disclosed in the claims.

At least one embodiment of the invention relates to an arrangement comprising
  a tablet computer unit with a tablet computer and a first connecting unit, the second connecting unit having a set of ferromagnetic regions,
  a housing part of a medical imaging apparatus, wherein the housing part of the medical imaging apparatus has a covering and a second connecting unit,
  the covering having a depression in which the tablet computer unit can be accommodated in a form-fit manner,
  the second connecting unit being arranged in a region of the depression such that via the first connecting unit and the second connecting unit, a magnetic connection can be formed which counteracts a removal of the tablet computer unit from the depression.

In particular, in one embodiment, an arrangement is herein disclosed, having
  a tablet computer unit with a tablet computer and a first connecting unit which has a set of ferromagnetic regions,
  a gantry of a medical imaging apparatus, wherein the gantry of the medical imaging apparatus has a covering and a second connecting unit,
  wherein the covering has a depression in which the tablet computer unit can be accommodated in a form-fit manner,
  wherein the second connecting unit is arranged in a region of the depression such that via the first connecting unit and the second connecting unit, a magnetic connection can be formed which counteracts a removal of the tablet computer unit from the depression,
  wherein the second connecting unit has a first set of magnetic regions which are spaced apart from one another and each face toward the depression with their north pole and together generate a first magnetic flux,
  wherein the second connecting unit has a second set of magnetic regions which are spaced apart from one another and each face toward the depression with their south pole and together generate a second magnetic flux, and
  wherein an absolute amount of the first magnetic flux through the covering in the region of the depression is substantially equal to an absolute amount of the second magnetic flux through the covering in the region of the depression.

In particular, in one embodiment, an arrangement comprises:
  a tablet computer unit including a tablet computer and a first connecting unit, the first connecting unit including a set of ferromagnetic regions; and
  a housing part of a medical imaging apparatus, the housing part including a covering and a second connecting unit, the second connecting unit including at least one set of magnetic regions,
  wherein the covering includes a depression configured to accommodate the tablet computer unit in a form-fit manner,
  wherein the second connecting unit is arranged in a region of the depression such that, via the first connecting unit and the second connecting unit, a magnetic connection is formable to counteract a removal of the tablet computer unit from the depression,
  wherein the tablet computer unit includes a first contact-based energy transfer element to receive electrical energy for the tablet computer, the energy transfer element being arranged in a region of the first connecting unit, and
  wherein the housing part include a second contact-based energy transfer element, corresponding to the first contact-based energy transfer element, to provide the electrical energy for the tablet computer, the energy transfer element being arranged in a region of the second connecting unit such that the first contact-based energy-transfer element and the second contact-based energy-transfer element are connected in a form-fit manner and electrically conductively to one another when the tablet computer unit is accommodated in a form-fit manner in the depression.

BRIEF DESCRIPTION OF THE DRAWINGS

The invention will now be described using example embodiments, making reference to the accompanying figures. The illustrations in the figures are schematic, greatly simplified and not necessarily to scale.

In the figures:

FIG. 16 shows a tablet computer unit with a first contact-based energy transfer element according to a further example.

DETAILED DESCRIPTION OF THE EXAMPLE EMBODIMENTS

Figure 1:
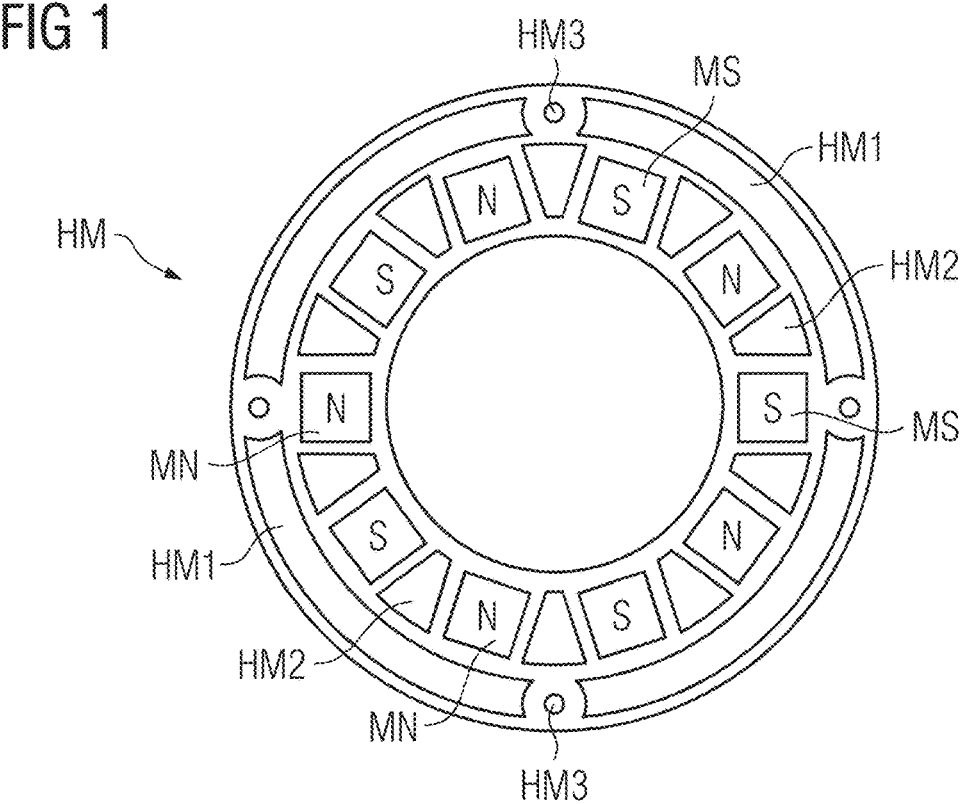
FIG. 1 shows the magnetic regions of the first set and the magnetic regions of the second set in a holding apparatus.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to an arrangement comprising
- a tablet computer unit with a tablet computer and a first connecting unit, the second connecting unit having a set of ferromagnetic regions,
- a housing part of a medical imaging apparatus, wherein the housing part of the medical imaging apparatus has a covering and a second connecting unit,
- the covering having a depression in which the tablet computer unit can be accommodated in a form-fit manner,
- the second connecting unit being arranged in a region of the depression such that via the first connecting unit and the second connecting unit, a magnetic connection can be formed which counteracts a removal of the tablet computer unit from the depression.

According to at least one embodiment of the invention, it is provided
- that the tablet computer unit has a first contact-based energy transfer element for receiving electrical energy for the tablet computer, the energy transfer element being arranged in a region of the first connecting unit, and
- that the housing part has a second contact-based energy transfer element corresponding to the first contact-based energy transfer element for providing the electrical energy for the tablet computer, the energy transfer element being arranged in a region of the second connecting unit such that the first contact-based energy transfer element and the second contact-based energy transfer element are connected in a form-fit manner and electrically conductively to one another when the tablet computer unit is accommodated in a form-fit manner in the depression.

In this manner, a magnetic connection for holding the tablet computer unit on the housing part of the medical imaging apparatus and a contact-based energy transfer between the housing part and the tablet computer unit can be combined. The contact-based energy transfer enables a rapid and reliable charging of the tablet computer unit with electrical energy, the electromagnetic compatibility (EMC)

being improved, for example, in comparison with a contactless energy transfer. In particular, thereby electromagnetic disturbances of an environment can be prevented.

According to one embodiment, it is provided that the second connecting unit has a first set of magnetic regions which are spaced apart from one another and each face toward the depression with their north pole and together generate a first magnetic flux, that the second connecting unit has a second set of magnetic regions which are spaced apart from one another and each face toward the depression with their south pole and together generate a second magnetic flux, and that an absolute amount of the first magnetic flux through the covering in the region of the depression is substantially equal to an absolute amount of the second magnetic flux through the covering in the region of the depression.

In the context of this disclosure, the absolute amount of the first magnetic flux through the covering in the region of the depression is regarded as being substantially equal to the absolute amount of the second magnetic flux through the covering in the region of the depression, in particular, if the absolute amount of the first magnetic flux through the covering in the region of the depression is greater than 80 percent, for example, greater than 90 percent, preferably greater than 95 percent and less than 120 percent, for example, less than 110 percent, preferably less than 105 percent, of the absolute amount of the second magnetic flux through the covering in the region of the depression.

In particular, the absolute amount of the first magnetic flux through the covering in the region of the depression is substantially equal to the absolute amount of the second magnetic flux through the covering in the region of the depression if the absolute amount of the first magnetic flux through the covering in the region of the depression is equal to the absolute amount of the second magnetic flux through the covering in the region of the depression.

In particular, it can be provided that the first magnetic flux and the second magnetic flux together exert an adhesive force on the first connecting unit when the tablet computer unit is accommodated in a form-fit manner in the depression. The amount of the adhesive force can be, for example, greater than 100 grams, in particular greater than a kilogram, in particular, greater than 10 kilograms.

The second connecting unit can have, in addition to the magnetic regions of the first set, further magnetic regions which each face toward the depression with their north pole. The second connecting unit can have, in addition to the magnetic regions of the second set, further magnetic regions which each face toward the depression with their south pole. In particular, an absolute amount of a magnetic flux through the covering in the region of the depression which all the magnetic regions of the second connecting unit that each face toward the depression with their north pole together generate, can be significantly greater or significantly less than an absolute amount of a magnetic flux through the covering in the region of the depression which all the magnetic regions of the second connecting unit that each face toward the depression with their south pole together generate.

In that the absolute amount of the first magnetic flux through the covering in the region of the depression is substantially equal to an absolute amount of the second magnetic flux through the covering in the region of the depression, it is brought about that the first magnetic flux and the second magnetic flux in their action at a distance substantially compensate for one another and that the resulting effect of the first magnetic flux and of the second magnetic flux on the first connecting unit declines very rapidly with increasing distance between the first connecting unit and the second connecting unit.

The magnetic force-fit therefore first occurs at a very small distance of the ferromagnetic regions of the first connecting unit from the magnetic regions of the second connecting unit. Therefore, the form-fit between the tablet computer unit and the depression takes precedence over the magnetic force-fit until this very small distance is reached. The tablet computer unit can thus be brought rapidly and without complication in the direction of the depression, and can be accommodated in the depression in an optimal manner and subsequently fixed via the magnetic connection. The arrangement thus enables an improved combination of form-fit and magnetic force-fit for holding the tablet computer unit.

One embodiment provides that the magnetic regions of the first set and the magnetic regions of the second set are arranged alternatingly such that for each magnetic region of the first set, the spacing from a respectively nearest magnetic region of the second set is smaller than the spacing from a respectively nearest magnetic region of the first set and/or that for each magnetic region of the second set, the spacing from a respectively nearest magnetic region of the first set is smaller than the spacing from a respectively nearest magnetic region of the second set.

This enables the first magnetic flux and the second magnetic flux substantially to compensate for one another even at small spacings between the first connecting unit and the second connecting unit in relation to the effect on the ferromagnetic regions of the first connecting unit.

One embodiment provides that the first set of magnetic regions has at least three, in particular, at least four, preferably at least five magnetic regions which are spaced apart from one another and each face toward the depression with their north pole and together generate the first magnetic flux. One embodiment provides that the second set of magnetic regions has at least three, in particular, at least four, preferably at least five magnetic regions which are spaced apart from one another and each face toward the depression with their south pole and together generate the second magnetic flux.

It can further be provided that each magnetic region of the first set and/or each magnetic region of the second set has at least one permanent magnet, in particular, is a permanent magnet. In particular, a magnetic region can have a plurality of permanent magnets which, for example, are spaced apart from one another and/or are polarized substantially parallel to one another. Magnets based upon, for example, neodymium, in particular, neodymium-iron-boron magnets can be used as permanent magnets.

It can further be provided that each magnetic region of the first set and/or each magnetic region of the second set has at least one electromagnet, in particular, is an electromagnet.

It can further be provided that each magnetic region of the first set and/or each magnetic region of the second set is configured flat, for example, cuboid or discoid and/or is polarized substantially perpendicular to an area in which this magnetic region extends two-dimensionally.

One embodiment provides that the magnetic regions of the first set and the magnetic regions of the second set are arranged along a closed path, in particular, along a convex closed path and/or that each magnetic region of the first set and each magnetic region of the second set is polarized substantially perpendicular, in particular, perpendicular to an area bordered by the closed path, in particular, to a convex area bordered by the convex closed path.

In particular, the magnetic regions of the first set and the magnetic regions of the second set can be arranged substantially evenly spaced along the closed path. In particular, a magnetic region of the second set can follow each magnetic region of the first set along the closed path. In particular, a magnetic region of the first set can follow each magnetic region of the second set along the closed path. In particular, each magnetic region of the first set can be polarized substantially opposingly to the nearest magnetic region of the second set along the closed path.

One embodiment provides that the closed path is a circular line and/or that the area bordered by the closed path is a circular area.

According to another embodiment, the closed path is a rectangular line, for example, with rounded corners and the area bordered by the closed path is a rectangular area, for example, with rounded corners.

One embodiment provides that the second contact-based energy transfer element is configured rotationally symmetrical and is arranged coaxially with the closed path. In particular, the first contact-based energy transfer element can be configured rotationally symmetrical and, when the tablet computer unit is accommodated in a form-fit manner in the depression, can be arranged coaxially with the closed path and the second contact-based energy transfer element.

The electrical energy for the tablet computer can thus be transferred through the area bordered by the closed path.

One embodiment provides,
that the first contact-based energy transfer element has a first tablet-side electrically conductive connection partner which protrudes relative to an, in particular, electrically insulating region of the first contact-based energy transfer element, the electrically insulating region surrounding the first tablet-side electrically conductive connection partner, and/or
that the second contact-based energy transfer element has a first housing-side electrically conductive connection partner which is arranged recessed relative to an, in particular, electrically insulating region of the second contact-based energy transfer element, the electrically insulating region surrounding the first housing-side electrically conductive connection partner.

In particular, it can be provided that the first tablet-side electrically conductive connection partner and the first housing-side electrically conductive connection partner form an electrically conductive connection when the tablet computer unit is accommodated in a form-fit manner in the depression.

Thus an accidental touching of the first housing-side electrically conductive connection partner can be prevented.

One embodiment provides,
that the first contact-based energy transfer element has a first tablet-side electrically conductive connection partner which, together with an, in particular, electrically insulating region of the first contact-based energy transfer element, the electrically insulating region surrounding the first tablet-side electrically conductive connection partner, forms a substantially smooth, in particular, smooth tablet-side contact area, and/or
that the second contact-based energy transfer element has a first housing-side electrically conductive connection partner which, together with an, in particular, electrically insulating region of the second contact-based energy transfer element, the electrically insulating region surrounding the first housing-side electrically conductive connection partner, forms a substantially smooth, in particular, smooth housing-side contact area.

In particular, it can be provided that the tablet-side contact area and the housing-side contact area adjoin one another areally when the tablet computer unit is accommodated in a form-fit manner in the depression.

In particular, it can be provided that the first tablet-side electrically conductive connection partner and the first housing-side electrically conductive connection partner form an electrically conductive connection when the tablet computer unit is accommodated in a form-fit manner in the depression.

This enables an improved cleaning capability of the first contact-based energy transfer element and/or of the second contact-based energy transfer element.

One embodiment provides that the arrangement, in particular, the tablet computer unit has a tablet-side sensor for generating a tablet-side sensor signal which relates to a form-fit accommodation of the tablet computer unit in the depression, and/or that the tablet computer unit has a circuit for switching, based upon the tablet-side sensor signal, at least one electrically conductive connection between the first contact-based energy transfer element and an energy store of the tablet computer unit, for example, in the form of a battery which is configured for storing the electrical energy.

One embodiment provides that the arrangement, in particular, the housing part has a housing-side sensor for generating a housing-side sensor signal which relates to a form-fit accommodation of the tablet computer unit in the depression, and/or that the housing part has a circuit for switching, based upon the housing-side sensor signal, at least one electrically conductive connection between the second contact-based energy transfer element and an energy source for the electrical energy.

In particular, it can be provided that at least one part of the tablet-side sensor is situated in the housing part and/or that at least one part of the housing-side sensor is situated in the tablet computer unit.

For example, the tablet-side sensor can have a tablet-side metallic contact partner which is arranged in the region of the first contact-based energy transfer element, and a housing-side metallic contact partner which is arranged in the region of the second contact-based energy transfer element, wherein the tablet-side metallic contact partner and the housing-side metallic contact partner close a metallic contact when the tablet computer unit is accommodated in a form-fit manner in the depression. In particular, the tablet-side sensor signal can be generated dependent on whether the metallic contact is closed.

One embodiment provides that the tablet-side sensor and/or the housing-side sensor is selected from a group which consists of a mechanical sensor, a thermal sensor, an optical sensor, a resistive sensor, an inductive sensor and a capacitive sensor.

The switching based upon the tablet-side sensor signal and/or the switching based upon the housing-side sensor signal can be used to prevent discharge currents and/or for leakage current suppression and/or to prevent a voltage on contacts directly touchable with a human finger. This is advantageous, in particular, if substantially smooth tablet-side and/or housing-side contact areas are used.

In particular, the second contact-based energy transfer element can have an inner electrically conductive ring and an outer electrically conductive ring which is configured coaxially with the inner electrically conductive ring of the second contact-based energy transfer element. In particular, the first contact-based energy transfer element can have an inner electrically conductive ring and an outer electrically conductive ring which is configured coaxially with the inner electrically conductive ring of the first contact-based energy transfer element.

The first tablet-side electrically conductive connection partner can be, for example, the inner electrically conductive ring and/or the outer electrically conductive ring of the first contact-based energy transfer element. The first housing-side electrically conductive connection partner can be, for example, the inner electrically conductive ring and/or the outer electrically conductive ring of the second contact-based energy transfer element.

In particular, it can be provided that when the tablet computer unit is accommodated in a form-fit manner in the depression, the inner electrically conductive ring of the first contact-based energy transfer element and the inner electrically conductive ring of the second contact-based energy transfer element form an inner electrically conductive contact which is configured annularly circumferential and/or coaxial with the closed path.

In particular, it can be provided that when the tablet computer unit is accommodated in a form-fit manner in the depression, the outer electrically conductive ring of the first contact-based energy transfer element and the outer electrically conductive ring of the second contact-based energy transfer element form an outer electrically conductive contact which is configured annularly circumferential and/or coaxial with the closed path.

For example, it can be provided that the housing part has both a contact-based energy transfer element and also an inductive energy transfer element for providing the electrical energy for the tablet computer, so that dependent on the configuration of the energy transfer element of the tablet computer unit, which energy transfer element receives the electrical energy, contact-based and/or inductive energy transfer can be used for charging the tablet computer unit with the electrical energy.

It can further be provided that each ferromagnetic region of the set of ferromagnetic regions of the first connecting unit is configured two-dimensionally such that in an operational state of the arrangement in which the tablet computer unit is accommodated in a form-fit manner in the depression, each magnetic region of the first set and/or each magnetic region of the second set is polarized substantially perpendicular to an area in which the respectively nearest ferromagnetic region extends two-dimensionally. In particular, it is provided that each ferromagnetic region of the set of ferromagnetic regions of the first connecting unit is not permanently magnetized, in particular, is not magnetized independently of the first magnetic flux and the second magnetic flux.

It can further be provided that the ferromagnetic regions of the set of ferromagnetic regions of the first connecting unit are spaced apart from one another such that, in an operational state of the arrangement in which the tablet computer unit is accommodated in a form-fit manner in the depression, each ferromagnetic region of the set of ferromagnetic regions of the first connecting unit covers an intermediate space corresponding to this ferromagnetic region, the intermediate space being formed between a magnetic region of the first set and a magnetic region of the second set that is nearest to this magnetic region of the first set.

It can further be provided that the ferromagnetic regions of the set of ferromagnetic regions of the first connecting unit are spaced apart from one another such that, in an operational state of the arrangement in which the tablet computer unit is accommodated in a form-fit manner in the depression, each magnetic region of the first set and/or each magnetic region of the second set covers an intermediate space corresponding to this magnetic region, the intermediate space being formed between two mutually adjoining ferromagnetic regions of the set of ferromagnetic regions of the first connecting unit.

It can further be provided that the first connecting unit has a holding apparatus for holding the ferromagnetic regions of the set of ferromagnetic regions, which is formed two-dimensionally and has an annular holding structure and a set of holding elements, the holding elements of the set of holding elements being spaced apart from one another and arranged in the plane of the annular holding structure projecting on the annular holding structure, each holding element being configured for accommodating a respective ferromagnetic region of the set of ferromagnetic regions.

According to an alternative arrangement, in place of the set of ferromagnetic regions, the first connecting unit has the first set of magnetic regions and the second set of magnetic regions, wherein the second connecting unit has the ferromagnetic regions. For such an alternative arrangement, the relative position and alignment as well as the interaction of the magnetic regions and/or of the ferromagnetic regions can be configured similarly to one of the aspects that are disclosed in relation to the claimed arrangement.

One embodiment provides that the first connecting unit forms an, in particular, flat protrusion which, in relation to a direction that is perpendicular to an area in which the tablet computer extends two-dimensionally, rises from a region of a housing of the tablet computer unit which surrounds the first connecting unit, the depression having a recess for, in particular, form-fit accommodation of the protrusion.

The protrusion can have, for example, in a plane which is parallel to the area in which the tablet computer extends two-dimensionally, the form of a rectangle with rounded corners, or the form of a circle. Correspondingly, for form-fit accommodation of the protrusion in a plane which is parallel to the area in which the tablet computer extends two-dimensionally, when the tablet computer unit is accommodated in a form-fit manner in the depression, the recess can have the form of the rectangle with rounded corners or the form of the circle.

It can further be provided that the depression has a border region wherein, in an operational state of the arrangement in which the tablet computer unit is accommodated in a form-fit manner in the depression, in the border region of the depression, the form-fit accommodation of the tablet computer unit is interrupted and between the covering in the region of the depression and a border region of the tablet computer unit, a recessed handle for grasping the tablet computer unit is configured, in particular, is configured such that on a side of the tablet computer unit that faces the depression, a pressing force can be exerted with a hand inner surface for removing the tablet computer unit from the depression YT.

According to one embodiment, the border region of the depression is configured corresponding to a border region of the tablet computer unit such that proceeding from an operational state of the arrangement in which the tablet computer unit is accommodated in a form-fit manner in the depression, the border region of the tablet computer unit can be sunk in the border region of the depression via a tilt movement of the tablet computer unit relative to the covering. In particular, the depression can have an edge region which is formed between the recess for accommodating the protrusion and the border region of the depression such that the tilt movement of the tablet computer unit about the edge region can be carried out. In particular, the recess of the tablet computer unit can lie on the edge region of the depression.

It can further be provided that between the, in particular, flat protrusion and a border region of the tablet computer unit, the tablet computer unit has a recess, in particular, for improving the grip of the tablet computer unit.

One embodiment provides, that the housing part of the medical imaging apparatus is a housing part of a gantry of the medical imaging apparatus. Another embodiment provides, that the housing part of the medical imaging apparatus is a housing part of a docking station of the medical imaging apparatus.

In particular, in one embodiment, an arrangement is herein disclosed, having
- a tablet computer unit with a tablet computer and a first connecting unit which has a set of ferromagnetic regions,
- a gantry of a medical imaging apparatus, wherein the gantry of the medical imaging apparatus has a covering and a second connecting unit,
- wherein the covering has a depression in which the tablet computer unit can be accommodated in a form-fit manner,
- wherein the second connecting unit is arranged in a region of the depression such that via the first connecting unit and the second connecting unit, a magnetic connection can be formed which counteracts a removal of the tablet computer unit from the depression,
- wherein the second connecting unit has a first set of magnetic regions which are spaced apart from one another and each face toward the depression with their north pole and together generate a first magnetic flux,
- wherein the second connecting unit has a second set of magnetic regions which are spaced apart from one another and each face toward the depression with their south pole and together generate a second magnetic flux, and
- wherein an absolute amount of the first magnetic flux through the covering in the region of the depression is substantially equal to an absolute amount of the second magnetic flux through the covering in the region of the depression.

In particular, an arrangement is herein disclosed, having
- a tablet computer unit with a tablet computer and a first connecting unit which has a set of ferromagnetic regions,
- a docking station of a medical imaging apparatus, wherein the docking station of the medical imaging apparatus has a covering and a second connecting unit,
- wherein the covering has a depression in which the tablet computer unit can be accommodated in a form-fit manner,
- wherein the second connecting unit is arranged in a region of the depression such that via the first connecting unit and the second connecting unit, a magnetic connection can be formed which counteracts a removal of the tablet computer unit from the depression,
- wherein the second connecting unit has a first set of magnetic regions which are spaced apart from one another and each face toward the depression with their north pole and together generate a first magnetic flux,
- wherein the second connecting unit has a second set of magnetic regions which are spaced apart from one another and each face toward the depression with their south pole and together generate a second magnetic flux, and
- wherein an absolute amount of the first magnetic flux through the covering in the region of the depression is substantially equal to an absolute amount of the second magnetic flux through the covering in the region of the depression.

In particular, an arrangement is herein disclosed, having
- a housing part of a medical imaging apparatus, wherein the housing part has a first connecting unit which has a set of ferromagnetic regions,
- a tablet computer unit with a tablet computer and a housing, wherein the housing of the tablet computer unit has a covering and a second connecting unit,
- wherein the covering has a depression in which the housing part of the medical imaging apparatus unit can be accommodated in a form-fit manner,
- wherein the second connecting unit is arranged in a region of the depression such that via the first connecting unit and the second connecting unit, a magnetic connection can be formed which counteracts a removal of the housing part of the medical imaging apparatus from the depression,
- wherein the second connecting unit has a first set of magnetic regions which are spaced apart from one another and each face toward the depression with their north pole and together generate a first magnetic flux,
- wherein the second connecting unit has a second set of magnetic regions which are spaced apart from one another and each face toward the depression with their south pole and together generate a second magnetic flux, and
- wherein an absolute amount of the first magnetic flux through the covering in the region of the depression is substantially equal to an absolute amount of the second magnetic flux through the covering in the region of the depression.

The first connecting unit of the housing part of the medical imaging apparatus can be configured according to one of the embodiments disclosed, in particular, for the first connecting unit of the tablet computer unit. The second connecting unit of the tablet computer unit can be configured according to one of the embodiments disclosed, in particular, for the second connecting unit of the housing part of the medical imaging apparatus.

One embodiment provides that the arrangement has the medical imaging apparatus.

The medical imaging apparatus can be selected, for example, from the imaging modality group which consists of an X-ray device, a C-arm X-ray device, a computed tomography (CT) device, a molecular imaging (MI) device, a single-photon emission computed tomography (SPECT) device, a positron emission tomography (PET) device, a magnetic resonance tomography (MR) device and combinations thereof, in particular, a PET-CT device and a PET-MR device. The medical imaging apparatus can further have a combination of an imaging modality which is selected, for example, from the imaging modalities group and an irradiation modality. Herein, the irradiation modality can have, for example, an irradiation unit for therapeutic irradiation.

The gantry of a medical imaging apparatus typically has a support construction on which, in particular, components of the acquisition unit, in particular, the radiation source and/or the radiation detector are arranged. The support construction of the gantry typically has such a high level of rigidity and strength that the components of the acquisition unit can be arranged both relative to one another and also relative to a region to be imaged in a geometry sufficiently defined for the imaging.

In a computed tomography device, the gantry typically has a support frame and a rotor that is mounted in a manner to be able to be rotated relative to the support frame, wherein the radiation source and the radiation detector are arranged on the rotor. Optionally, the gantry can have a tilt frame that is mounted in a manner to be able to be tilted relative to the support frame, the rotor being arranged on the tilt frame.

The housing part of the gantry of the medical imaging apparatus can be, for example, a housing part of the support frame of the gantry of the medical imaging apparatus or a housing part of the tilt frame of the gantry of the medical imaging apparatus. The covering of the gantry of the medical imaging apparatus can be, for example, a covering of the support frame of the gantry of the medical imaging apparatus or a covering of the tilt frame of the gantry of the medical imaging apparatus.

In a C-arm X-ray device, the gantry typically has a support frame and a rotor that is mounted in a manner to be able to be rotated relative to the support frame, the radiation source and the radiation detector being arranged on the C-arm.

In a magnetic resonance tomography device, the gantry typically has a support frame on which the main magnet and a first radio frequency antenna unit are arranged, the first radio frequency antenna unit being configured in the form of a coil that is known to persons skilled in the art by the expression "body coil".

The use of the indefinite article "a" or "an" does not preclude that the relevant feature can also be present plurally. The use of the expression "have" does not preclude that the terms linked via the expression "have" can be identical. For example, the medical imaging apparatus has the medical imaging apparatus. The use of the expression "unit" does not preclude that the subject matter to which the expression "unit" relates can have a plurality of components that are spatially separated from one another.

FIG. 1 shows the magnetic regions MN of the first set and the magnetic regions MS of the second set, the magnetic regions MN of the first set and the magnetic regions MS of the second set being arranged in the holding apparatus HM. The holding apparatus HM has the structures HM1 and HM2 which are configured for increasing the rigidity of the holding apparatus HM and/or form press-on areas for attaching the holding apparatus HM to the covering V. The holding apparatus HM can be screw-fastened to the covering V via a plurality of screws which are fed through the openings HM3.

The magnetic regions MN of the first set and the magnetic regions MS of the second set are arranged alternatingly such that for each magnetic region MN of the first set, the spacing from a respectively nearest magnetic region MS of the second set is smaller than the spacing from a respectively nearest magnetic region MN of the first set.

The first set of magnetic regions MN has five magnetic regions and the second set of magnetic regions MS has five magnetic regions. Each magnetic region MN of the first set and each magnetic region MS of the second set is a cuboid permanent magnet that is configured two-dimensional and is polarized perpendicular to an area in which it extends two-dimensionally.

The magnetic regions MN of the first set and the magnetic regions MS of the second set are arranged along a closed path in the form of a circular line. Each magnetic region MN of the first set and each magnetic region MS of the second set is polarized perpendicular to a circular area bordered by the closed path.

Figure 2:
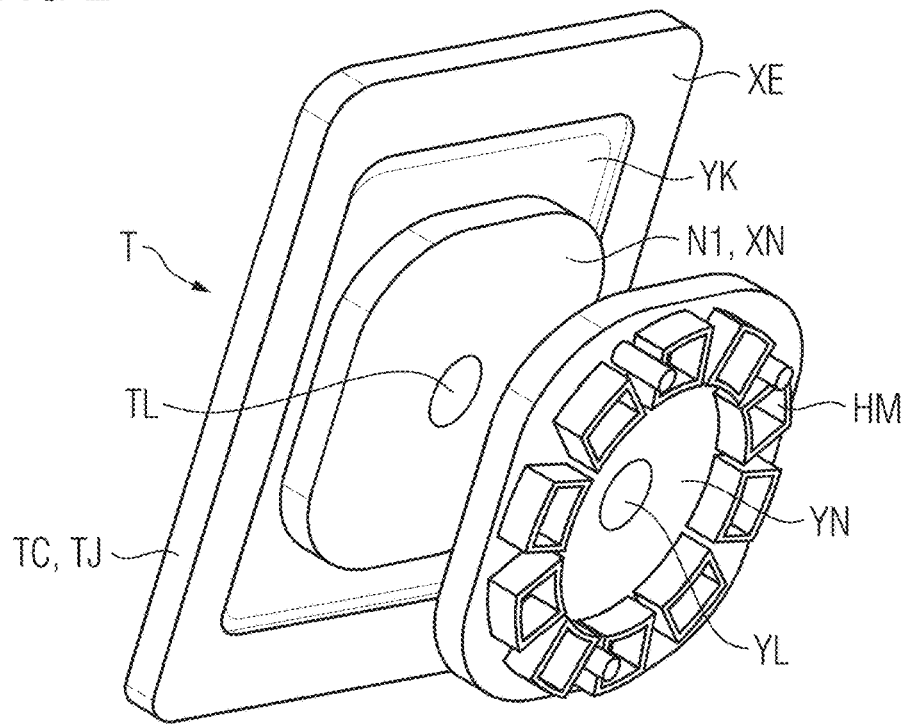
FIG. 2 shows the tablet computer unit and a further example of a holding apparatus for holding magnetic regions.

FIG. 2 shows the tablet computer unit T and a further example of a holding apparatus HM for holding magnetic regions. The tablet computer unit T has a tablet computer TC and the housing TJ of the tablet computer unit T.

The tablet computer TC, which has its own tablet computer housing, is situated in the housing TJ of the tablet computer unit T. The housing TJ has the first connecting unit N1 and the first contact-based energy transfer element TL for receiving electrical energy for the tablet computer TC. In particular, the side of the housing TJ facing away from the tablet computer TC is hygienically designed, for example, can be easily cleaned and antimicrobially coated.

The housing TJ has a cut-out in the region of the screen of the tablet computer TC, so that the user U1 can touch the touch-sensitive screen of the tablet computer TC while the tablet computer TC is situated in the housing TJ. A seal is arranged between the screen of the tablet computer TC and the housing TJ such that contaminants cannot penetrate through a gap formed between the screen of the tablet computer TC and the housing TJ into the interior of the housing TJ.

The first connecting unit N1 has a set of ferromagnetic regions MF. The first connecting unit N1 forms a flat protrusion XN which, in relation to a direction that is perpendicular to an area in which the tablet computer TC extends two-dimensionally, rises from a region of a housing TJ of the tablet computer unit T which surrounds the first connecting unit N1. The tablet computer unit T has a recess YK between the flat protrusion XN and the border region XE of the tablet computer unit T. The fingertips of the fingers of one hand which grasps the border region XE of the tablet computer unit T can be placed on the recess YK, so that the grip of the tablet computer unit T is improved.

Figure 3:
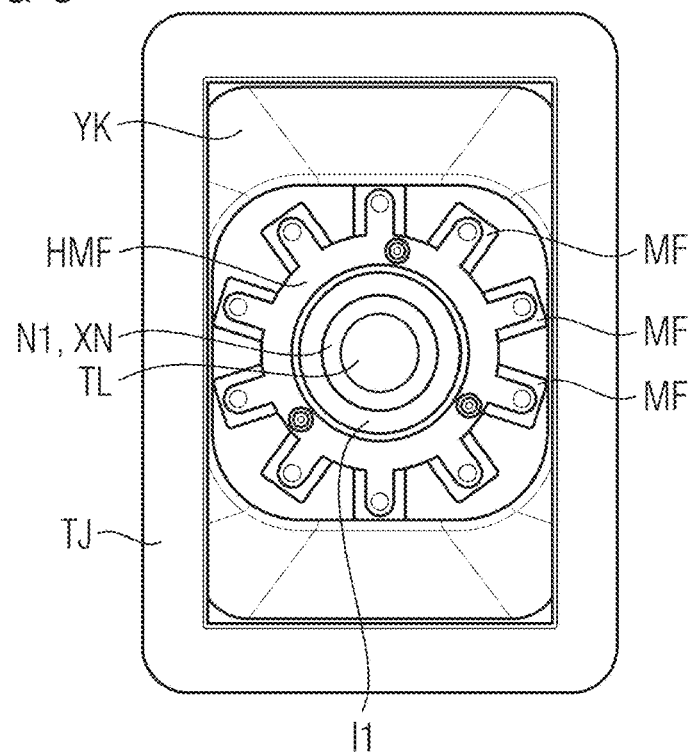
FIG. 3 shows the housing of the tablet computer unit with the first connecting unit.

FIG. 3 shows a housing TJ of the tablet computer unit T with the first connecting unit N1. The ferromagnetic regions MF of the set of ferromagnetic regions MF of the first connecting unit N1 in the form of metal plates are formed spaced apart from one another and two-dimensional. The tablet computer unit T has a first contact-based energy transfer element TL for receiving electrical energy for the tablet computer TC, the energy transfer element being arranged in a region of the first connecting unit N1.

The tablet computer unit T further has an inductive energy transfer element I1 for receiving electrical energy inductively for the tablet computer TC, the energy transfer element being arranged in a region of the first connecting unit N1. Depending on the configuration of the energy transfer element of the housing part, which energy transfer element provides the electrical energy, contact-based and/or inductive energy transfer can be used for charging the tablet computer unit T with the electrical energy.

In an operational state of the arrangement 1 in which the tablet computer unit T is accommodated in a form-fit manner in the depression YT, each ferromagnetic region MF covers an intermediate space corresponding to this ferromagnetic region, the intermediate space being formed between a magnetic region MN of the first set and a magnetic region MS of the second set that is nearest to this magnetic region MF of the first set.

In an operational state of the arrangement 1 in which the tablet computer unit T is accommodated in a form-fit manner in the depression YT, each magnetic region MN of the first set and/or each magnetic region MS of the second set covers an intermediate space corresponding to this magnetic region, the intermediate space being formed between two mutually adjacent ferromagnetic regions of the set of ferromagnetic regions MF of the first connecting unit N1.

In this way, each ferromagnetic region MF is optimally permeated by the magnetic field lines which extend between the magnetic region MN of the first set and the magnetic region MS of the second set between which the intermediate space corresponding to this ferromagnetic region is formed. By this, the magnetic attractive force which the magnetic regions of the first set and the magnetic regions of the second set exert on the ferromagnetic regions can act more effectively.

The first connecting unit N1 has a holding apparatus HMF for the ferromagnetic regions MF, the holding apparatus being formed two-dimensionally and having an annular holding structure and a set of holding elements. These holding elements are spaced apart from one another and arranged in the plane of the annular holding structure projecting on the annular holding structure, each holding element being configured for accommodating a respective ferromagnetic region MF.

In an operational state of the arrangement 1 in which the tablet computer unit T is accommodated in a form-fit manner in the depression YT, each magnetic region MN of the first set and each magnetic region MS of the second set is polarized substantially perpendicular to an area of the metal plate which forms the nearest ferromagnetic region MF.

Figure 4:
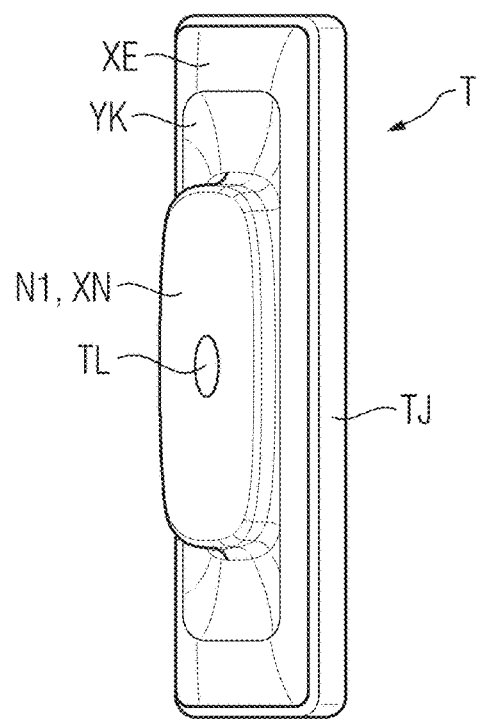
FIGS. 4 and 5 show further views of the tablet computer unit.
Figure 5:
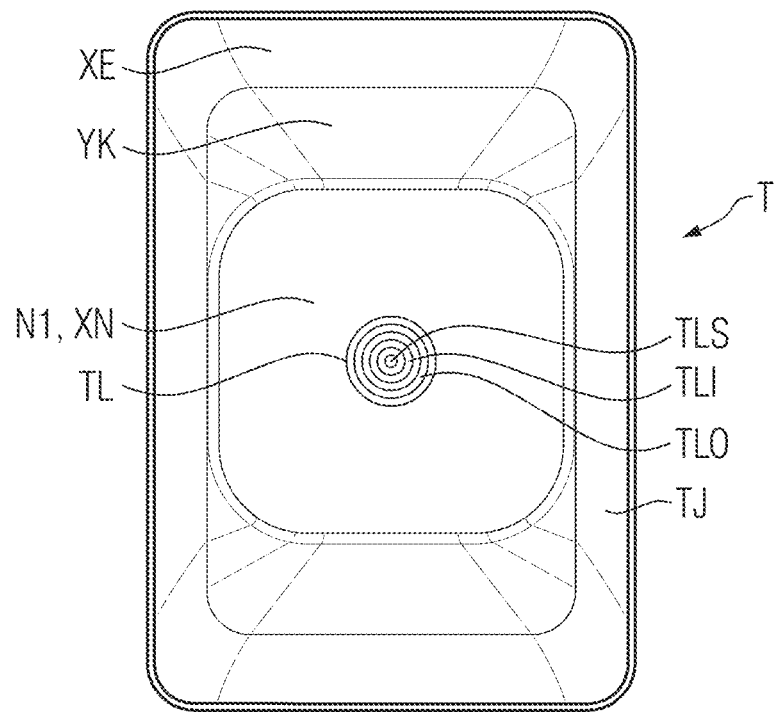

FIGS. 4 and 5 show further views of the tablet computer unit T.

Figure 6:
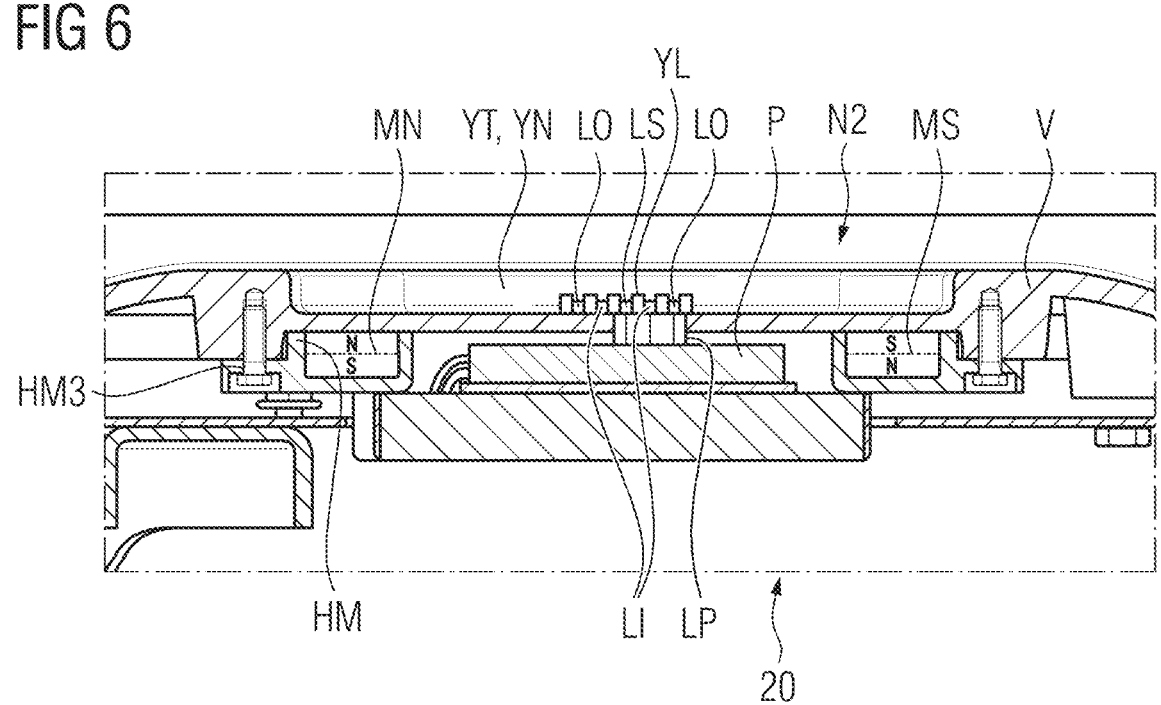
FIG. 6 shows the second connecting unit in a sectional view.

FIG. 6 shows the second connecting unit N2 in a sectional view. The gantry 20 of the medical imaging apparatus 2 has the covering V and the second connecting unit N2. The covering V has a depression YT in which the tablet computer unit T can be accommodated in a form-fit manner.

The second connecting unit N2 is arranged in a region of the depression YT such that via the first connecting unit N1 and the second connecting unit N2, a magnetic connection can be formed which counteracts a removal of the tablet computer unit T from the depression YT. The second connecting unit N2 has a first set of magnetic regions MN which are spaced apart from one another and each face toward the depression YT with their north pole and together generate a first magnetic flux. The second connecting unit N2 has a second set of magnetic regions MS which are spaced apart from one another and each face toward the depression YT with their south pole and together generate a second magnetic flux. An absolute amount of the first magnetic flux through the covering V in the region of the depression YT is substantially equal to an absolute amount of the second magnetic flux through the covering V in the region of the depression YT.

The gantry 20 has a second contact-based energy transfer element YL corresponding to the first contact-based energy transfer element TL for providing the electrical energy for the tablet computer TC, the energy transfer element being arranged in a region of the second connecting unit N2 such that the first contact-based energy-transfer element TL and the second contact-based energy-transfer element YL are connected in a form-fit manner and electrically conductively to one another when the tablet computer unit T is accommodated in a form-fit manner in the depression YT.

The second energy transfer element YL is conductively connected via the feed-through LP to the electronics module P for contact-based charging.

The second contact-based energy transfer element YL is configured rotationally symmetrical and is arranged coaxially with the closed path. The first contact-based energy transfer element is configured rotationally symmetrical and, when the tablet computer unit T is accommodated in a form-fit manner in the depression YT, is arranged coaxially with the closed path and the second contact-based energy transfer element YL.

The electrical energy for the tablet computer TC can thus be transferred through the area bordered by the closed path.

The second contact-based energy transfer element YL has an inner electrically conductive ring LI and an outer electrically conductive ring LO which is configured coaxially with the inner electrically conductive ring LI of the second contact-based energy transfer element YL. The first contact-based energy transfer element TL has an inner electrically conductive ring TLI and an outer electrically conductive ring TLO which is configured coaxially with the inner electrically conductive ring TLI of the first contact-based energy transfer element TL.

When the tablet computer unit T is accommodated in a form-fit manner in the depression YT, the inner electrically conductive ring TLI of the first contact-based energy transfer element TL and the inner electrically conductive ring LI of the second contact-based energy transfer element YL form an inner electrically conductive contact which is configured annularly circumferential and coaxial with the closed path.

When the tablet computer unit T is accommodated in a form-fit manner in the depression YT, the outer electrically conductive ring TLO of the first contact-based energy transfer element TL and the outer electrically conductive ring LO of the second contact-based energy transfer element YL form an outer electrically conductive contact which is configured annularly circumferential and coaxial with the closed path.

The first contact-based energy transfer element TL has a first tablet-side electrically conductive connection partner TLI which protrudes relative to a region of the first contact-based energy transfer element TL, the region surrounding the first tablet-side electrically conductive connection partner TLI.

Figure 7:
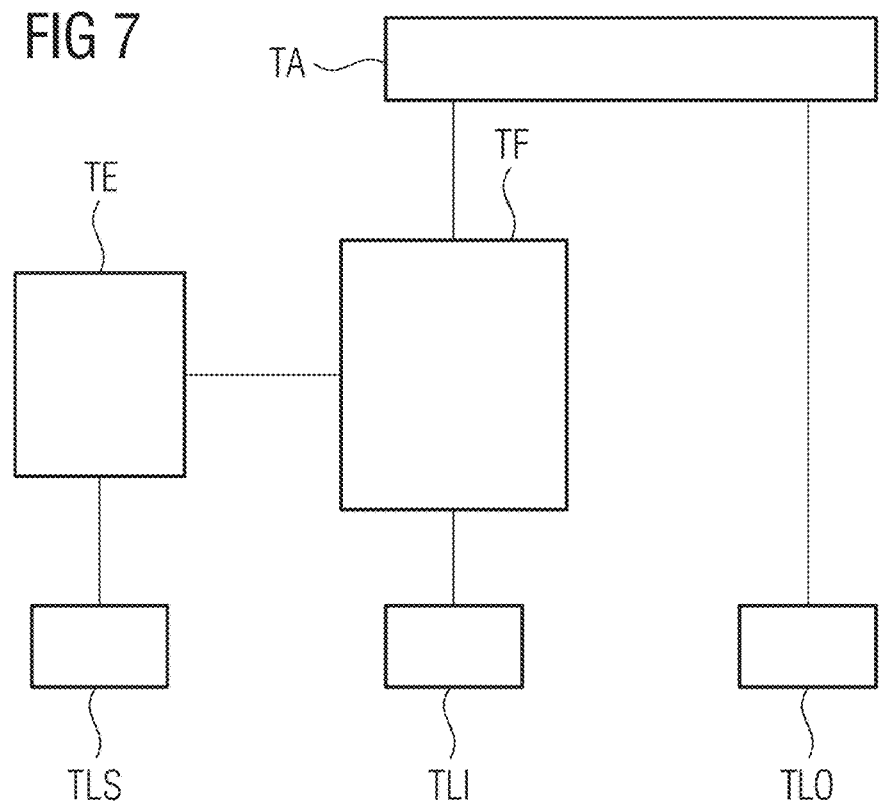
FIG. 7 shows a tablet-side sensor.

FIG. 7 shows the tablet-side sensor with the sensor interface TLS, for example, in the form of a tablet-side metallic contact and the sensor circuit TE which outputs the tablet-side sensor signal which relates to a form-fit accommodation of the tablet computer unit T in the depression YT.

The tablet computer unit T has the circuit TF for switching, based upon the tablet-side sensor signal, at least one electrically conductive connection between the first contact-based energy transfer element TL and an energy store TA of the tablet computer unit T, which is configured for storing the electrical energy.

Figure 8:
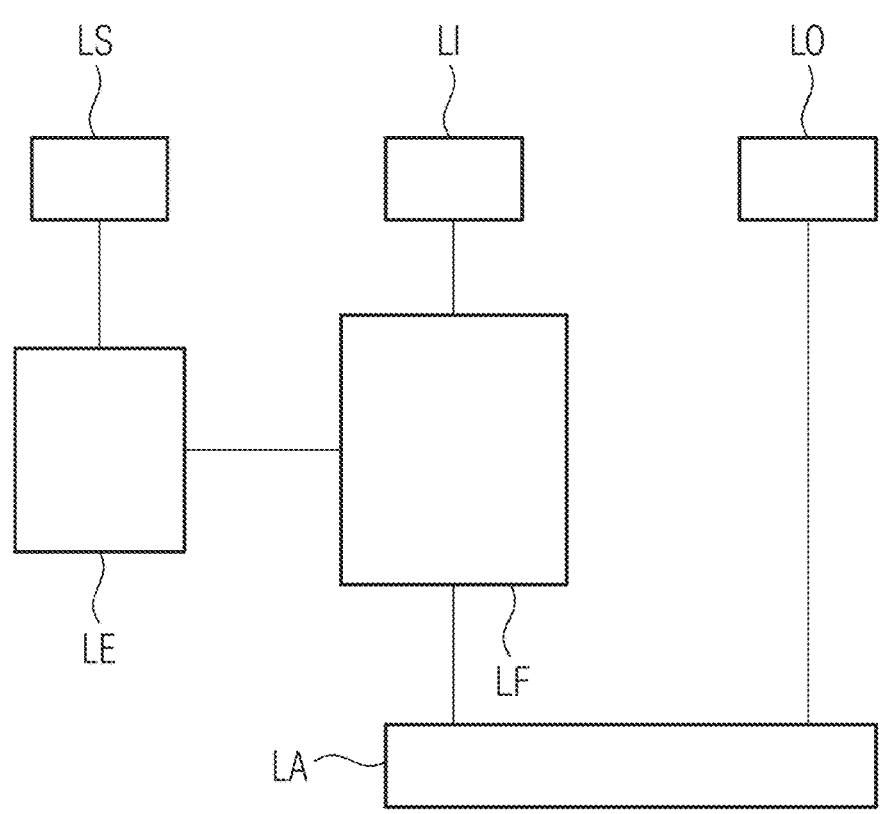
FIG. 8 shows a housing-side sensor.

FIG. 8 shows a housing-side sensor with the sensor interface LS, for example, in the form of a housing-side metallic contact and the sensor circuit LE which outputs the housing-side sensor signal which relates to a form-fit accommodation of the tablet computer unit T in the depression YT.

The housing part has a circuit LF for switching, based upon the housing-side sensor signal, at least one electrically conductive connection between the second contact-based energy transfer element YL and an energy source LA for the electrical energy.

Figure 9:
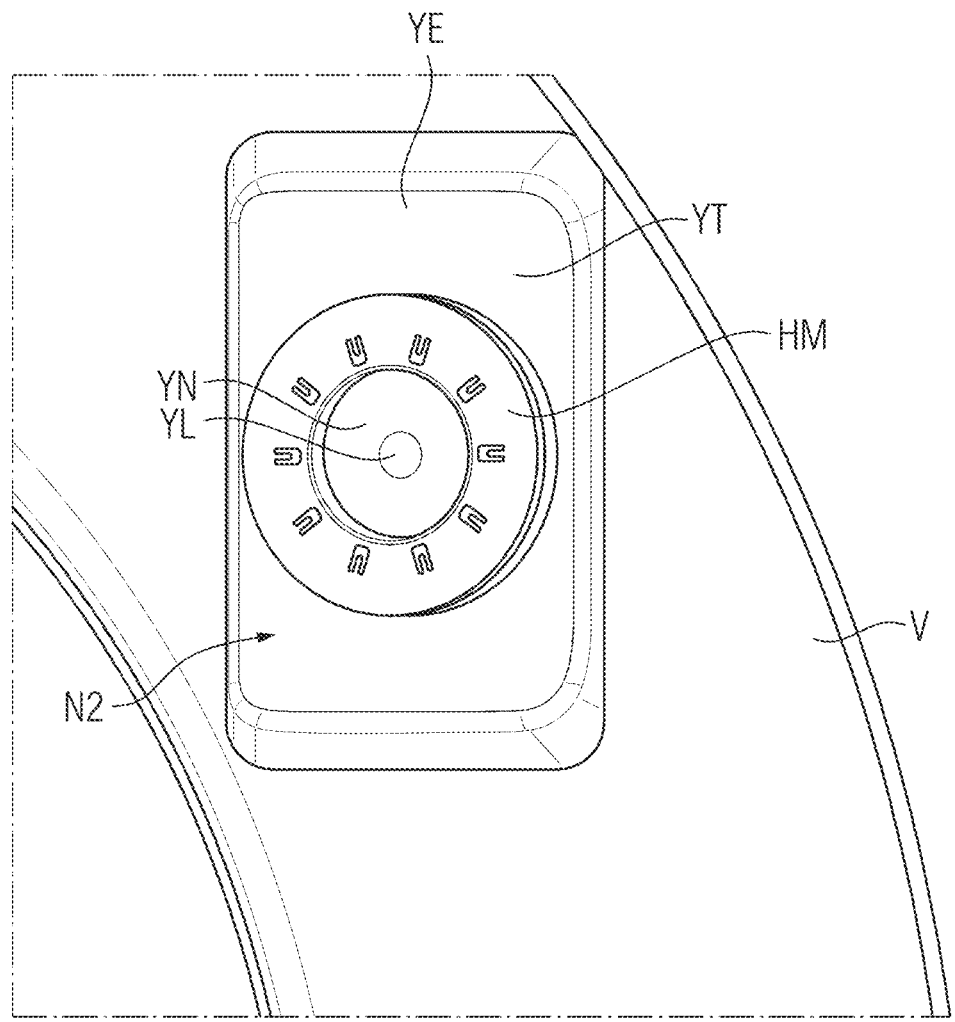
FIG. 9 shows a side of the covering which faces the interior of the medical imaging apparatus.

FIG. 9 shows a side of the covering V which faces the interior of the medical imaging apparatus 2 in the region of the depression YT.

Figure 10:
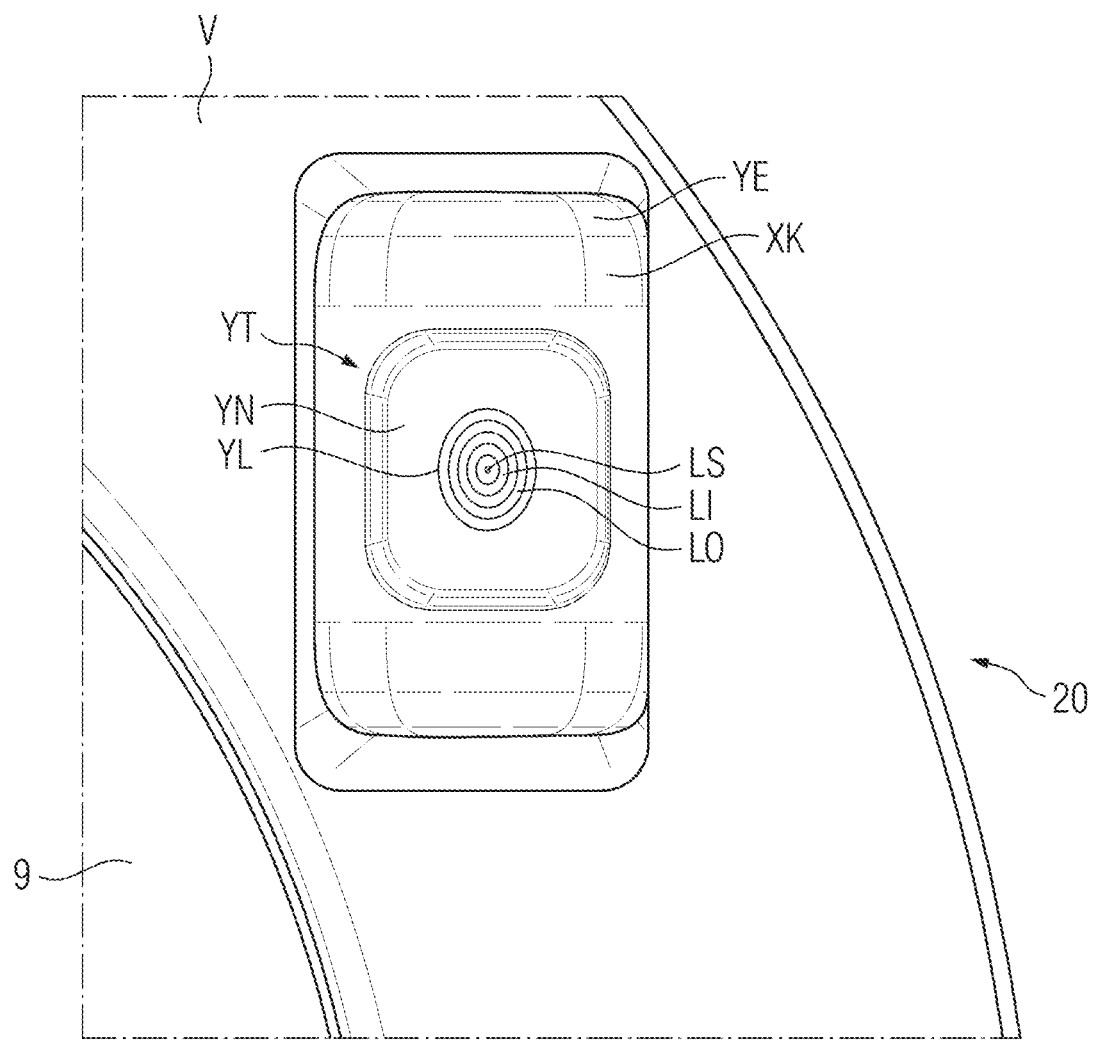
FIG. 10 shows a side of the covering which is visible from outside, in the region of the depression.

FIG. 10 shows a side of the covering V which is visible from outside, in the region of the depression YT. The depression YT has a recess YN for form-fit accommodation of the protrusion XN.

Figure 11:
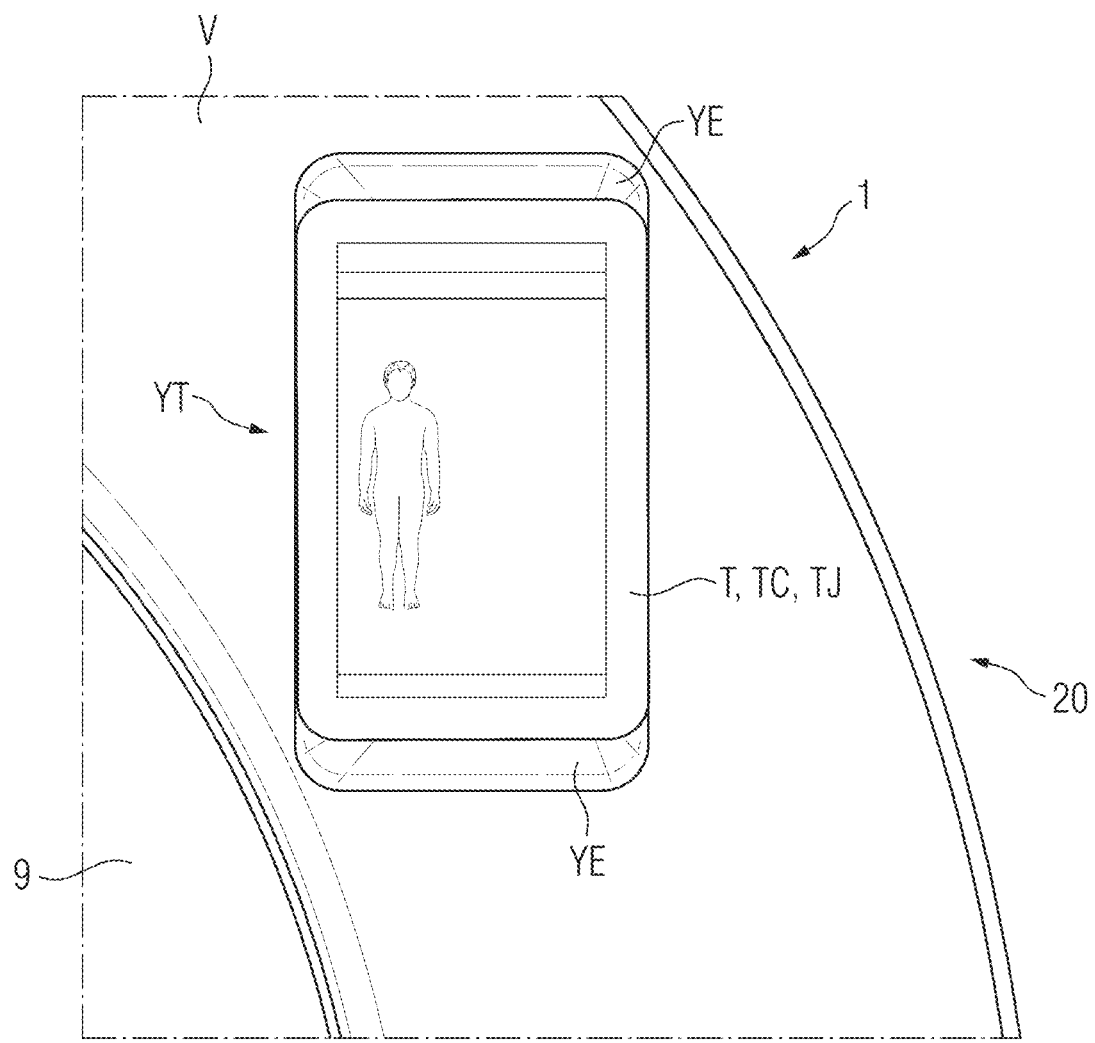
FIG. 11 shows the arrangement with the tablet computer unit and a gantry of the medical imaging apparatus.

FIG. 11 shows the arrangement 1 with the tablet computer unit T and the gantry 20 of the medical imaging apparatus 2 in an operational state, in which the tablet computer unit T is accommodated in a form-fit manner in the depression YT. The depression YT has a border region YE in which the form-fit accommodation of the tablet computer unit T is interrupted. Between the covering V in the region of the depression YT and the border region XE of the tablet computer unit T, a recessed handle for grasping the tablet computer unit T is configured such that on a side of the tablet computer unit T that faces the depression YT, a pressing force can be exerted by the user U1 with a hand inner surface to remove the tablet computer unit T from the depression YT. Such a recessed handle is configured on an upper border region of the depression YT and on a lower border region of the depression YT.

It is thus possible that a user U1 pulls the tablet computer unit T out of the depression YT with both hands simultaneously, grasping with one hand in the upper recessed handle and with the other hand in the lower recessed handle. In order to reduce the effort required to remove the tablet computer unit T, it can be advantageous if the user U1 grasps only in one of the two recessed handles and, in this way, exerts a tilting moment on the tablet computer unit T via the pressing force of his/her hand inner surface, wherein a lever effect of the tablet computer unit T is utilized to overcome the form-fit and the magnetic force-fit.

The border region YE of the depression YT is further configured corresponding to a border region XE of the tablet computer unit T such that proceeding from the operational state of the arrangement 1 in which the tablet computer unit T is accommodated in a form-fit manner in the depression YT, the border region XE of the tablet computer unit T can be sunk in the border region YE of the depression via a tilt movement of the tablet computer unit T relative to the covering V.

The depression YT has an edge region XK which is configured between the recess YN for accommodating the protrusion XN and the border region YE of the depression YT such that the tilt movement of the tablet computer unit T about the edge region XK can be carried out.

By sinking the border region XE of the tablet computer unit T in the border region YE of the depression, it can be achieved that the opposite border region of the tablet computer unit T protrudes significantly above the covering V of the gantry 20 and can thus be grasped more effectively by a user U1.

Figure 12:
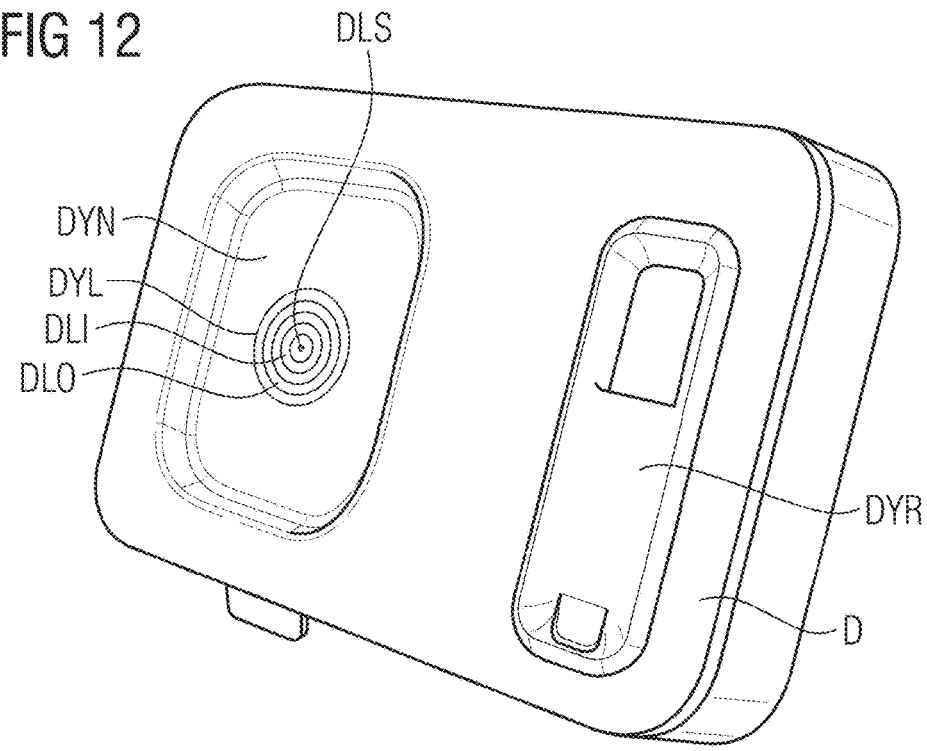
FIG. 12 shows the docking station for accommodating the tablet computer unit and the remote control unit.

FIG. 12 shows a docking station D for accommodating the tablet computer unit T and the remote control unit R. For this purpose, the docking station D has a covering with a recess DYN for form-fit accommodation of the protrusion XN. The docking station D has a third connecting unit which is arranged in the region of the recess DYN such that via the first connecting unit N1 and the third connecting unit, a magnetic connection can be formed which counteracts a removal of the tablet computer unit T from the docking station. The third connecting unit is configured according to one of the embodiments disclosed for the second connecting unit. The docking station D further has a depression DYR for form-fit accommodation of the remote control unit R.

The docking station D has a second contact-based energy transfer element DYL corresponding to the first contact-based energy transfer element TL for providing the electrical energy for the tablet computer TC, the energy transfer element being arranged in a region of the third connecting unit such that the first contact-based energy-transfer element TL and the second contact-based energy-transfer element DYL are connected in a form-fit manner and electrically conductively to one another when the protrusion XN is accommodated in a form-fit manner in the recess DYN.

The second contact-based energy transfer element DYL has an inner electrically conductive ring DLI and an outer electrically conductive ring DLO which is configured coaxially with the inner electrically conductive ring DLI of the second contact-based energy transfer element DYL.

When the protrusion XN is accommodated in a form-fit manner in the recess DYN, the inner electrically conductive ring TLI of the first contact-based energy transfer element TL and the inner electrically conductive ring DLI of the second contact-based energy transfer element DYL form an inner electrically conductive contact which is configured annularly circumferential and coaxial with the closed path.

When the protrusion XN is accommodated in a form-fit manner in the recess DYN, the outer electrically conductive ring TLO of the first contact-based energy transfer element TL and the outer electrically conductive ring DLO of the second contact-based energy transfer element DYL form an outer electrically conductive contact which is configured annularly circumferential and coaxial with the closed path.

The sensor interface DLS and a sensor circuit associated therewith, which are situated in the interior of the docking station D form a sensor for generating a housing-side sensor signal which relates to the form-fit accommodation of the protrusion XN in the recess DYN. In particular, it can be provided that a voltage is only switched to the second contact-based energy transfer element DYL when the protrusion XN is accommodated in a form-fit manner in the recess DYN.

Figure 13:
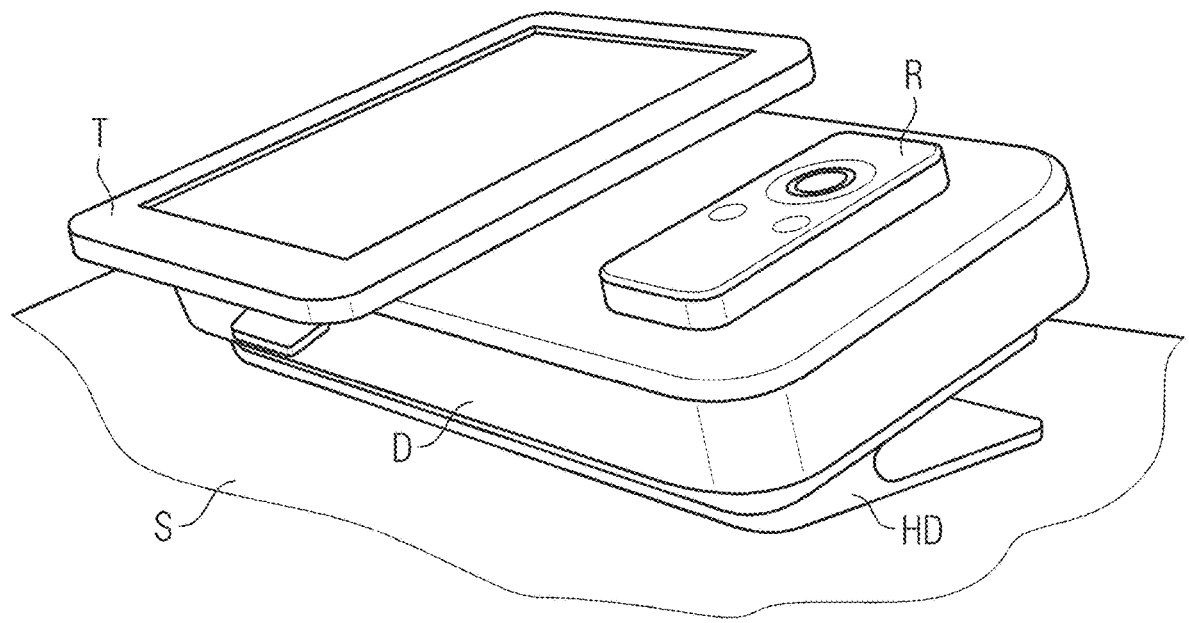
FIG. 13 shows the docking station on which the tablet computer unit and the remote control unit are arranged.

FIG. 13 shows the docking station D on which the tablet computer unit T and the remote control unit R are arranged. The docking station D is mounted on a positioning device HD for tilted positioning of the docking station D, so that the screen plane of the tablet computer TC is tilted relative to the table surface S. This enables an improved utilization of the tablet computer TC in ergonomic respects. The positioning device HD can further be configured for adjusting, for example, for stepped or stepless adjusting of the inclination angle between the screen plane of the tablet computer TC and the table surface S.

Figure 14:
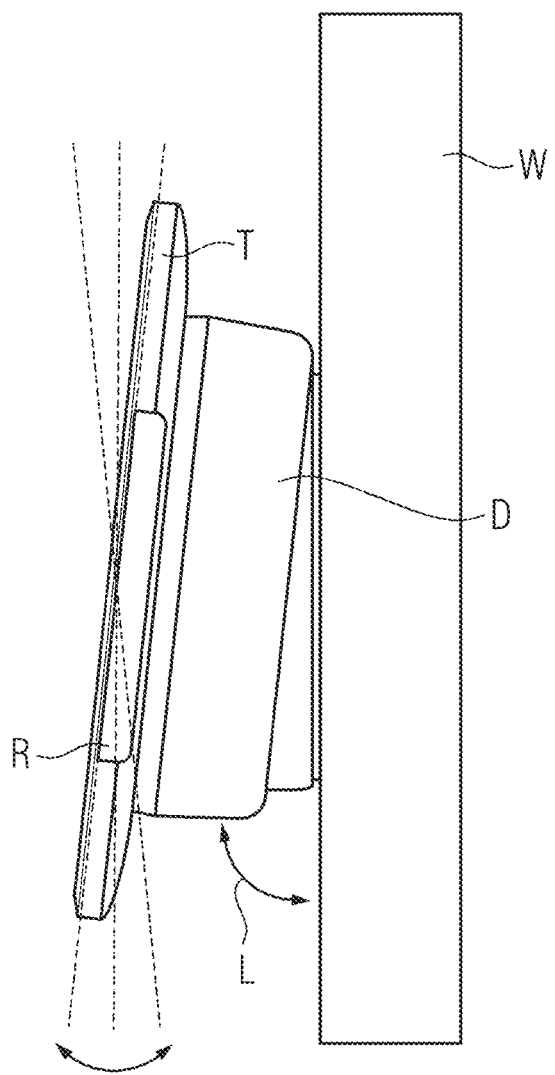
FIG. 14 shows the docking station attached to the wall, on which the tablet computer unit and the remote control unit are arranged.

FIG. 14 shows the docking station D on which the tablet computer unit T and the remote control unit R are arranged, the docking station D being attached to a wall W, an inclination angle L between the screen plane of the tablet computer TC and the wall W being adjustable, for example, allowing stepped or stepless adjustment.

Figure 15:
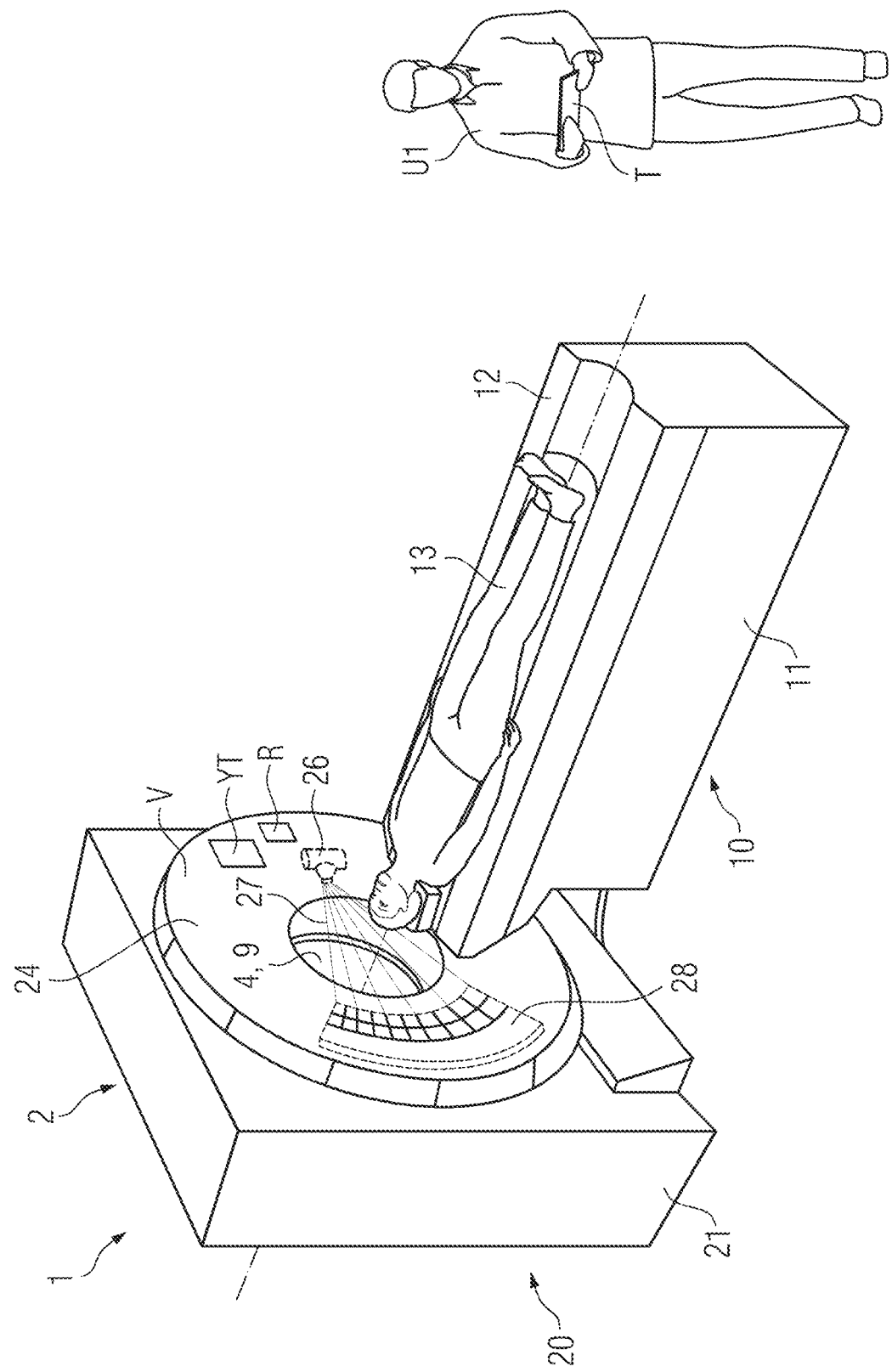
FIG. 15 shows the arrangement with the tablet computer unit and the medical imaging apparatus.

FIG. 15 shows the arrangement 1 with the tablet computer unit T and the medical imaging apparatus 2. Without restricting the general inventive concept, for the medical imaging apparatus 2, by way of example, a computed tomography device is shown. The medical imaging apparatus 2 has a gantry 20, the tunnel-shaped opening 9, the patient positioning device 10 and the control device 30.

The gantry 20 has the support frame 21 and the rotor 24. The rotor 24 is arranged on the support frame 21 in a manner to be able to be rotated relative to the support frame 21 a rotary positioning apparatus. The patient 13 can be introduced into the tunnel-shaped opening 9. The acquisition region 4 is situated in the tunnel-shaped opening 9. In the acquisition region 4, a region of a patient 13 that is to be imaged can be positioned such that the radiation 27 can pass from the radiation source 26 to the region to be imaged and following an interaction with the region to be imaged, can arrive at the radiation detector 28.

The patient positioning device 10 has the positioning base 11 and the positioning table 12 for positioning the patient 13. The positioning table 12 is arranged on the positioning base 11 in a manner able to be moved relative to the positioning base 11 such that the positioning table 12 can be guided in a longitudinal direction of the positioning table 12 into the acquisition region 4.

FIG. 16 shows a tablet computer unit T with a first contact-based energy transfer element TL for receiving electrical energy for the tablet computer TC according to a further example.

The first contact-based energy transfer element TL has a first inner electrically conductive pin TLI1, a second inner electrically conductive pin TLI2, a first outer electrically conductive pin TLO1 and a second outer electrically conductive pin TLO2.

When the tablet computer unit T according to FIG. 16 is accommodated in a form-fit manner in the depression YT, the first inner electrically conductive pin TLI1 and/or the second inner electrically conductive pin TLI2 of the first contact-based energy transfer element TL, on the one hand, and the inner electrically conductive ring LI of the second contact-based energy transfer element YL, on the other hand, form an inner electrically conductive contact. In particular, the first inner electrically conductive pin TLI1 and/or the second inner electrically conductive pin TLI2 can be spring mounted such that it is pressed against the inner electrically conductive ring LI of the second contact-based energy transfer element YL when the tablet computer unit T according to FIG. 16 is accommodated in a form-fit manner in the depression YT.

When the tablet computer unit T according to FIG. 16 is accommodated in a form-fit manner in the depression YT, the first outer electrically conductive pin TLO1 and/or the second outer electrically conductive pin TLO2 of the first contact-based energy transfer element TL, on the one hand, and the outer electrically conductive ring LO of the second contact-based energy transfer element YL, on the other hand, form an outer electrically conductive contact. In particular, the first outer electrically conductive pin TLO1 and/or the second outer electrically conductive pin TLO2 can be spring mounted such that it is pressed against the outer electrically conductive ring LO of the second contact-based energy transfer element YL when the tablet computer unit T according to FIG. 16 is accommodated in a form-fit manner in the depression YT.

The first contact-based energy transfer element TL of the tablet computer unit T according to FIG. 16 has a first tablet-side electrically conductive connection partner TLI in the form of the first inner electrically conductive pin TLI1 and/or of the second inner electrically conductive pin TLI2, which protrudes relative to a region of the first contact-based energy transfer element TL, the region surrounding the first tablet-side electrically conductive connection partner TLI.

When the protrusion XN of the tablet computer unit T according to FIG. 16 is accommodated in a form-fit manner in the recess DYN, the first inner electrically conductive pin TLI1 and/or the second inner electrically conductive pin TLI2 of the first contact-based energy transfer element TL, on the one hand, and the inner electrically conductive ring DLI of the second contact-based energy transfer element DYL, on the other hand, form an inner electrically conductive contact. In particular, the first inner electrically conductive pin TLI1 and/or the second inner electrically conductive pin TLI2 can be spring mounted such that it is pressed against the inner electrically conductive ring DLI of the second contact-based energy transfer element DYL when the protrusion XN of the tablet computer unit T according to FIG. 16 is accommodated in a form-fit manner in the recess DYN.

When the protrusion XN of the tablet computer unit T according to FIG. 16 is accommodated in a form-fit manner in the recess DYN, the first outer electrically conductive pin TLO1 and/or the second outer electrically conductive pin TLO2 of the first contact-based energy transfer element TL, on the one hand, and the outer electrically conductive ring DLO of the second contact-based energy transfer element DYL, on the other hand, form an outer electrically conductive contact. In particular, the first outer electrically conductive pin TLO1 and/or the second outer electrically conductive pin TLO2 can be spring mounted such that it is pressed against the outer electrically conductive ring DLO of the second contact-based energy transfer element DYL when the protrusion XN of the tablet computer unit T according to FIG. 16 is accommodated in a form-fit manner in the recess DYN.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An arrangement, comprising:
   a tablet computer unit including
      a first connecting unit including a set of ferromagnetic regions, and
      a first contact-based energy transfer element in a region of the first connecting unit; and
   a housing part of a medical imaging apparatus, the housing part including
      a covering including a depression configured to accommodate the tablet computer unit,
      a second connecting unit in a region of the depression,
      a housing-side sensor, and a second contact-based energy transfer element, corresponding to the first contact-based energy transfer element,
wherein the second connecting unit includes
a first set of magnetic regions spaced apart from one another, a north pole of each respective magnetic region of the first set of magnetic regions facing toward the depression, and
a second set of magnetic regions, spaced apart from one another, a south pole of each respective magnetic region of the second set of magnetic regions facing toward the depression, and
wherein the first set of magnetic regions and the second set of magnetic regions are arranged alternately such that
for each respective magnetic region of the first set of magnetic regions and the second set of magnetic regions, a spacing from a respective nearest magnetic region is equal,
for each respective magnetic region of the first set of magnetic regions, a spacing from a respective nearest magnetic region of the second set of magnetic regions is smaller than a spacing from a respective nearest magnetic region of the first set of magnetic regions, and
for each respective magnetic region of the second set of magnetic regions, the spacing from a respective nearest magnetic region of the first set of magnetic regions is smaller than a spacing from a respective nearest magnetic region of the second set of magnetic regions.

2. The arrangement of claim 1,
wherein the first set of magnetic regions is configured to generate a first magnetic flux,
wherein the second set of magnetic regions is configured to generate a second magnetic flux, and
wherein an absolute amount of the first magnetic flux through the covering in the region of the depression is substantially equal to an absolute amount of the second magnetic flux through the covering in the region of the depression.

3. The arrangement of claim 2,
wherein the first set of magnetic regions and the second set of magnetic regions are arranged along a closed path, and
wherein each magnetic region of the first set of magnetic regions and each magnetic region of the second set of magnetic regions is polarized perpendicular to an area bordered by the closed path.

4. The arrangement of claim 3,
wherein the closed path is a circular line, and
wherein the area bordered by the closed path is a circular area.

5. The arrangement of claim 2, wherein the first contact-based energy transfer element includes a first tablet-side electrically conductive connection partner protruding relative to a region of the first contact-based energy transfer element, an electrically insulating region surrounding the first tablet-side electrically conductive connection partner, wherein the second contact-based energy transfer element includes a first housing-side electrically conductive connection partner recessed relative to a region of the second contact-based energy transfer element, an electrically insulating region surrounding the first housing-side electrically conductive connection partner, and wherein the first tablet-side electrically conductive connection partner and the first housing-side electrically conductive connection partner are configured to form an electrically conductive connection when the tablet computer unit is accommodated in a form-fit manner in the depression.

6. The arrangement of claim 2,
wherein the first contact-based energy transfer element includes a first tablet-side electrically conductive connection partner which, together with a region of the first contact-based energy transfer element, forms a substantially smooth tablet-side contact area, the region of the first contact-based energy transfer element surrounding the first tablet-side electrically conductive connection partner,
wherein the second contact-based energy transfer element includes a first housing-side electrically conductive connection partner which, together with a region of the second contact-based energy transfer element, forms a substantially smooth housing-side contact area, the region of the second contact-based energy transfer element surrounding the first housing-side electrically conductive connection partner,
wherein the tablet-side contact area and the housing-side contact area are configured to adjoin one another areally when the tablet computer unit is accommodated in a form-fit manner in the depression, and
wherein the first tablet-side electrically conductive connection partner and the first housing-side electrically conductive connection partner are configured to form an electrically conductive connection when the tablet computer unit is accommodated in a form-fit manner in the depression.

7. The arrangement of claim 2,
wherein the arrangement includes a tablet-side sensor configured to generate a tablet-side sensor signal relating to a form-fit accommodation of the tablet computer unit in the depression, and
wherein the tablet computer unit includes a circuit configured to switch, based upon the tablet-side sensor signal, an electrically conductive connection between the first contact-based energy transfer element and an energy store of the tablet computer unit, configured to store electrical energy.

8. The arrangement of claim 1,
wherein the first set of magnetic regions includes at least three magnetic regions, and
wherein the second set of magnetic regions includes at least three magnetic regions.

9. The arrangement of claim 1,
wherein the first set of magnetic regions and the second set of magnetic regions are along a closed path, and
wherein each magnetic region of the first set of magnetic regions and each magnetic region of the second set of magnetic regions is polarized perpendicular to an area bordered by the closed path.

10. The arrangement of claim 9,
wherein the closed path is a circular line, and
wherein the area bordered by the closed path is a circular area.

11. The arrangement of claim 10,
wherein the second contact-based energy transfer element is rotationally symmetrical and is arranged coaxially with the closed path.

12. The arrangement of claim 1,
wherein the t computer unit des a tablet computer,
wherein the first connecting unit includes a protrusion which, in relation to a direction perpendicular to an area in which the tablet computer extends two-dimensionally, rises from a region of a housing of the tablet computer unit surrounding the first connecting unit, and wherein the depression includes a recess configured to accommodate the protrusion in a form-fit manner.

13. The arrangement of claim 1, wherein the first contact-based energy transfer element includes a first tablet-side electrically conductive connection partner protruding relative to a region of the first contact-based energy transfer element, an electrically insulating region surrounding the first tablet-side electrically conductive connection partner, wherein the second contact-based energy transfer element includes a first housing-side electrically conductive connection partner recessed relative to a region of the second contact-based energy transfer element, an electrically insulating region surrounding the first housing-side electrically conductive connection partner, and wherein the first tablet-side electrically conductive connection partner and the first housing-side electrically conductive connection partner are configured to form an electrically conductive connection when the tablet computer unit is accommodated in a form-fit manner in the depression.

14. The arrangement of claim 1,
wherein the first contact-based energy transfer element includes a first tablet-side electrically conductive connection partner which, together with a region of the first contact-based energy transfer element, forms a substantially smooth tablet-side contact area, the region of the first contact-based energy transfer element surrounding the first tablet-side electrically conductive connection partner,
wherein the second contact-based energy transfer element includes a first housing-side electrically conductive connection partner which, together with a region of the second contact-based energy transfer element, forms a substantially smooth housing-side contact area, the region of the second contact-based energy transfer element surrounding the first housing-side electrically conductive connection partner,
wherein the tablet-side contact area and the housing-side contact area are configured to adjoin one another areally when the tablet computer unit is accommodated in a form-fit manner in the depression, and
wherein the first tablet-side electrically conductive connection partner and the first housing-side electrically conductive connection partner are configured to form an electrically conductive connection when the tablet computer unit is accommodated in a form-fit manner in the depression.

15. The arrangement of claim 1,
wherein the arrangement includes a tablet-side sensor configured to generate a tablet-side sensor signal relating to a form-fit accommodation of the tablet computer unit in the depression, and
wherein the tablet computer unit includes a circuit configured to switch, based upon the tablet-side sensor signal, an electrically conductive connection between the first contact-based energy transfer element and an energy store of the tablet computer unit, configured to store the electrical energy.

16. The arrangement of claim 15, wherein at least one of the tablet-side sensor or the housing-side sensor is a mechanical sensor, a thermal sensor, an optical sensor, a resistive sensor, an inductive sensor, or a capacitive sensor.

17. The arrangement of claim 1,
wherein the housing-side sensor is configured to generate a housing-side sensor signal relating to a form-fit accommodation of the tablet computer unit in the depression, and
wherein the housing part includes a circuit configured to switch, based upon the housing-side sensor signal, at least one electrically conductive connection between the second contact-based energy transfer element and an energy source for electrical energy.

18. The arrangement of claim 17, wherein at least one of a tablet-side sensor or the housing-side sensor is a mechanical sensor, a thermal sensor, an optical sensor, a resistive sensor, an inductive sensor, or a capacitive sensor.

19. The arrangement of claim 1,
wherein the housing part of the medical imaging apparatus is a housing part of a gantry of the medical imaging apparatus.

20. The arrangement of claim 1, further comprising the medical imaging apparatus.

21. The arrangement of claim 1,
wherein the tablet computer unit includes a tablet computer, and
wherein the depression includes a first border region configured to allow a second border region of the tablet computer to sink into the first border region via a tilt movement of the tablet computer, accommodated in a form-fit manner, relative to the covering such that a third border region opposite from the second border region of the tablet computer protrudes above the covering.

22. The arrangement of claim 1, wherein the second contact-based energy transfer element includes
an inner electrically conductive ring coaxial with a sensor interface of the housing-side sensor, and
an outer electrically conductive ring coaxial with the sensor interface of the housing-side sensor and the inner electrically conductive ring.

23. The arrangement of claim 1, wherein the first contact-based energy transfer element and the second contact-based energy transfer element are configured to be connected in a form fit manner and electrically conductively to one another when the tablet computer unit is accommodated in the form fit manner in the depression.

* * * * *